(12) United States Patent
Jägle et al.

(10) Patent No.: US 10,926,630 B2
(45) Date of Patent: Feb. 23, 2021

(54) DRIVE DEVICE FOR A MOTOR VEHICLE AND METHOD FOR OPERATING A DRIVE DEVICE

(71) Applicant: AUDI AG, Ingolstadt (DE)

(72) Inventors: Karl Jägle, Ingolstadt (DE); Thomas Hoffmann, Riedenburg (DE); Markus Störmer, Berching (DE)

(73) Assignee: AUDI AG, Ingolstadt (DE)

( * ) Notice: Subject to any disclaimer, the term of this patent is extended or adjusted under 35 U.S.C. 154(b) by 268 days.

(21) Appl. No.: 15/889,557

(22) Filed: Feb. 6, 2018

(65) Prior Publication Data
US 2018/0229604 A1    Aug. 16, 2018

(30) Foreign Application Priority Data
Feb. 16, 2017    (DE) .......................... 102017202484.4

(51) Int. Cl.
*B60K 6/36*    (2007.10)
*B60K 25/00*    (2006.01)
(Continued)

(52) U.S. Cl.
CPC ................. *B60K 17/28* (2013.01); *B60K 6/36* (2013.01); *B60K 6/365* (2013.01); *B60K 6/383* (2013.01);
(Continued)

(58) Field of Classification Search
CPC .......... B60K 6/36; B60K 6/365; B60K 6/383; B60K 6/445; B60K 6/48; B60K 6/547;
(Continued)

(56) References Cited

U.S. PATENT DOCUMENTS 3,590,663 A * 7/1971 Yamaguchi ............. F16H 47/08
477/135
4,362,139 A * 12/1982 Isobe ........................ F02D 1/04
123/364
(Continued)

FOREIGN PATENT DOCUMENTS

| AT | 517352 A4 | 1/2017 |
| CN | 106143107 A | 11/2016 |

(Continued)

OTHER PUBLICATIONS

German examination report dated Feb. 26, 2019 in corresponding German Application No. 10 2017 202 484.4 including Partial machine-generated English language translation; 10 pgs.
(Continued)

*Primary Examiner* — Barry Gooden, Jr.
(74) *Attorney, Agent, or Firm* — Maier & Maier, PLLC

(57) ABSTRACT

A drive device for a motor vehicle, with a first drive assembly, a second drive assembly, and an auxiliary drive having at least one auxiliary assembly. The auxiliary drive being coupled to or can be coupled to, respectively, the first drive assembly and the second drive assembly via an epicyclic gear transmission. The auxiliary drive is coupled to a first transmission element of the epicyclic gear transmission. In this case, a second transmission element of the epicyclic gear transmission is coupled by a gearshift transmission, which is shifted in a speed-dependent manner, to a secondary drive shaft, which is coupled to or can be coupled to the first drive assembly.

8 Claims, 2 Drawing Sheets

(51) Int. Cl.
- *B60K 25/02* (2006.01)
- *B60K 6/365* (2007.10)
- *B60K 6/48* (2007.10)
- *B60K 25/06* (2006.01)
- *B60K 17/28* (2006.01)
- *B60K 6/547* (2007.10)
- *B60K 6/383* (2007.10)
- *F16D 43/06* (2006.01)
- *F16H 1/28* (2006.01)
- *F16H 37/06* (2006.01)
- *F16H 55/17* (2006.01)

(52) U.S. Cl.
CPC ............ *B60K 6/48* (2013.01); *B60K 6/547* (2013.01); *B60K 25/00* (2013.01); *B60K 25/02* (2013.01); *B60K 25/06* (2013.01); *F16D 43/06* (2013.01); *F16H 1/28* (2013.01); *F16H 37/065* (2013.01); *B60K 2006/4825* (2013.01); *B60K 2025/024* (2013.01); *F16H 55/17* (2013.01); *F16H 2055/178* (2013.01); *Y02T 10/62* (2013.01)

(58) Field of Classification Search
CPC ........ B60K 25/00; B60K 25/02; B60K 25/06; B60K 2025/005; B60K 2025/024; F16D 43/06; F02B 67/00
See application file for complete search history.

(56) References Cited

U.S. PATENT DOCUMENTS

| | | | | |
|---|---|---|---|---|
| 4,662,244 A * | 5/1987 | Kaneyuki | ............ | F02B 67/04 475/161 |
| 5,011,464 A * | 4/1991 | White | ............ | F16H 3/56 475/259 |
| 5,823,072 A * | 10/1998 | Legner | ............ | F16H 47/02 74/733.1 |
| 6,048,288 A * | 4/2000 | Tsujii | ............ | B60H 1/3222 477/5 |
| 9,108,505 B2 * | 8/2015 | Supina | ............ | B60K 6/547 |
| 10,328,787 B2 * | 6/2019 | Scholle | ............ | B60K 6/365 |
| 10,377,222 B2 * | 8/2019 | Hoffmann | ............ | B60K 25/06 |
| 10,399,431 B2 * | 9/2019 | Vollmer | ............ | B60K 6/48 |
| 10,427,516 B2 * | 10/2019 | Hoffmann | ............ | B60K 17/165 |
| 10,661,649 B2 * | 5/2020 | Waldner | ............ | B60K 6/365 |
| 2003/0104900 A1 * | 6/2003 | Takahashi | ............ | F02N 11/04 477/3 |
| 2008/0032842 A1 * | 2/2008 | Johnson | ............ | F02B 67/06 475/5 |
| 2008/0039263 A1 * | 2/2008 | Usoro | ............ | B60K 25/02 475/157 |
| 2008/0051242 A1 * | 2/2008 | Usoro | ............ | B60K 25/02 475/5 |
| 2008/0096711 A1 * | 4/2008 | Smith | ............ | B60K 6/365 475/5 |
| 2008/0099256 A1 * | 5/2008 | Holmes | ............ | B60K 6/26 180/65.27 |
| 2008/0103679 A1 * | 5/2008 | Ruiz | ............ | B60K 6/36 701/106 |
| 2008/0179119 A1 * | 7/2008 | Grenn | ............ | B60W 10/08 477/5 |
| 2008/0242498 A1 * | 10/2008 | Miller | ............ | B60W 10/30 477/5 |
| 2009/0176611 A1 * | 7/2009 | Avery | ............ | B60K 25/02 475/5 |
| 2010/0056312 A1 * | 3/2010 | Akutsu | ............ | B60K 6/365 475/1 |
| 2010/0071974 A1 * | 3/2010 | Akutsu | ............ | B60K 6/26 180/65.265 |
| 2010/0222171 A1 * | 9/2010 | Tabata | ............ | B60L 50/16 475/5 |
| 2011/0065543 A1 * | 3/2011 | Usoro | ............ | B60K 6/48 475/5 |
| 2012/0043145 A1 * | 2/2012 | Gecim | ............ | B60K 6/485 180/65.28 |
| 2012/0158232 A1 * | 6/2012 | Banerjee | ............ | B60K 25/00 701/22 |
| 2012/0290158 A1 * | 11/2012 | Yoshikawa | ............ | B60W 10/02 701/22 |
| 2013/0006460 A1 * | 1/2013 | Endo | ............ | F02B 67/00 701/22 |
| 2013/0075183 A1 * | 3/2013 | Kochidomari | ............ | B60K 7/0007 180/292 |
| 2015/0239335 A1 * | 8/2015 | Wachter | ............ | B60K 6/387 475/5 |
| 2016/0082821 A1 * | 3/2016 | Mueller | ............ | B60K 6/26 180/65.21 |
| 2017/0021834 A1 * | 1/2017 | Tohta | ............ | B60W 10/06 |
| 2017/0166194 A1 * | 6/2017 | Kumazaki | ............ | B60W 10/06 |
| 2017/0341502 A1 * | 11/2017 | Scholle | ............ | B60K 6/365 |
| 2018/0001759 A1 * | 1/2018 | Hoffmann | ............ | B60K 6/365 |
| 2018/0022337 A1 * | 1/2018 | Burjes | ............ | B60W 10/30 477/4 |
| 2018/0029584 A1 * | 2/2018 | Ishikawa | ............ | B60K 6/365 |
| 2018/0099553 A1 * | 4/2018 | Hoffmann | ............ | B60K 17/06 |
| 2018/0099554 A1 * | 4/2018 | Hoffmann | ............ | B60K 6/365 |
| 2018/0147938 A1 * | 5/2018 | Stormer | ............ | B60K 6/48 |
| 2018/0229604 A1 * | 8/2018 | Jagle | ............ | B60K 6/36 |
| 2018/0335132 A1 * | 11/2018 | Vollmer | ............ | F16H 3/089 |
| 2018/0345781 A1 * | 12/2018 | Stormer | ............ | B60K 6/365 |
| 2019/0032731 A1 * | 1/2019 | Eo | ............ | F16D 23/02 |
| 2020/0130507 A1 * | 4/2020 | Hashimoto | ............ | F01P 3/18 |

FOREIGN PATENT DOCUMENTS

| | | |
|---|---|---|
| CN | 107914562 A | 4/2018 |
| DE | 10 2006 037 577 A1 | 2/2008 |
| DE | 10 2006 037 576 A1 | 4/2008 |
| DE | 10 2008 006 578 A1 | 8/2008 |
| DE | 10 2008 030 717 A1 | 12/2009 |
| DE | 10 2009 038 338 A1 | 2/2011 |
| DE | 10 2010 036 235 A1 | 5/2011 |
| DE | 10 2011 077 089 A1 | 12/2012 |
| EP | 3 305 572 A1 | 4/2018 |

OTHER PUBLICATIONS

European Search Report dated May 4, 2018, in connection with corresponding EP Application No. 18155055.9 (10 pgs.).
German Office Action dated Jan. 16, 2018, in connection with corresponding DE Application No. 10 2017 202 484.4 (12 pgs.).
Office Action dated Jun. 30, 2020 in corresponding Chinese Application No. 20181014690.0; 17 pages including English-language translation.

\* cited by examiner

DRIVE DEVICE FOR A MOTOR VEHICLE AND METHOD FOR OPERATING A DRIVE DEVICE

FIELD

The invention relates to a drive device for a motor vehicle with a first drive assembly, a second drive assembly, and an auxiliary drive having at least one auxiliary assembly, this drive being coupled to or can be coupled to, respectively, the first drive assembly and the second drive assembly via an epicyclic gear transmission, wherein the auxiliary drive is coupled to a first transmission element of the epicyclic gear transmission. The invention further relates to a method for operating a drive device for a motor vehicle.

BACKGROUND

The drive device serves for driving the motor vehicle and in this respect, therefore, for supplying a torque directed at driving the motor vehicle. The drive device supplies the torque, which may also be referred to as a drive torque, to a driven shaft of the drive device. For example, the driven shaft is operatively connected rigidly and/or permanently to a wheel axle of the motor vehicle or to at least one wheel of the motor vehicle that can be associated with the wheel axle. The operative connection between the driven shaft and the wheel axle or the wheel can be produced via a transmission, such as, for example, a differential transmission, in particular a center differential transmission, and/or an axle differential transmission.

The drive device is equipped with a plurality of drive assemblies, namely at least the first drive assembly and the second drive assembly. The two drive assemblies can fundamentally be designed in any way. For example, the drive assemblies are of different type, so that the drive device is configured in this respect as a hybrid drive device. For example, in this case, the first drive assembly can be present in the form of an internal combustion engine and the second drive assembly can be configured as an electric motor.

In addition to the two drive assemblies, the drive device is equipped with the auxiliary drive, which includes the at least one auxiliary assembly. The auxiliary drive is coupled to or can be coupled to, respectively, the first drive assembly and the second drive assembly via the epicyclic gear transmission. This means that the auxiliary drive can be driven via the epicyclic gear transmission by means of the first drive assembly, by means of the second drive assembly, or by means of both the first drive assembly and the second drive assembly. The auxiliary drive can be coupled to the respective drive assembly via the epicyclic gear transmission, namely, for example, permanently. Alternatively, it is solely capable of being coupled so that the operative connection between the auxiliary drive and the respective drive assembly is present only temporarily or is produced only temporarily.

The auxiliary drive is connected to the first transmission element of the epicyclic gear transmission. Fundamentally, the epicyclic gear transmission is equipped with a plurality of transmission elements, namely the first transmission element, a second transmission element, and a third transmission element. One of the transmission elements can be designed as a planetary gear carrier, at which at least one planetary gear is rotatably mounted. Another of the transmission elements is designed as a sun gear and a third transmission element is designed as a ring gear. The planetary gear then meshes with both the sun gear and the ring gear. Other designs of the epicyclic gear transmission can also be realized, however.

SUMMARY

The object of the invention is to propose a drive device for a motor vehicle that, in comparison to known drive devices, offers advantages and, in particular, is characterized by a high energy efficiency as well as a great flexibility.

It is provided in this case that a second transmission element of the epicyclic gear transmission is coupled to a secondary drive shaft, which is coupled to or can be coupled to the first drive assembly, via a gearshift transmission, which is shifted in a speed-dependent manner.

Fundamentally, the auxiliary drive is to be integrated in the drive device in such a way that it or the at least one auxiliary assembly can be operated in an especially energy-efficient manner, whereas, at the same time, the drive device can be engaged flexibly, in particular in numerous operating states of the motor vehicle. In particular, an interaction between at least one of the drive assemblies, and in particular both drive assemblies, and the auxiliary drive is to be realized. This means that the auxiliary drive or an auxiliary drive shaft of the auxiliary drive can be driven preferably optionally by means of the first drive assembly, by means of the second drive assembly, and/or by means of the kinetic energy of the motor vehicle.

The latter can be realized by way of a linkage of the auxiliary drive or of the auxiliary drive shaft, which is independent of the first drive assembly, to the secondary drive shaft of the drive device. For example, the secondary drive shaft is coupled to the driven shaft of the drive device and, in particular, is coupled or at least can be coupled rigidly and/or permanently. Accordingly, the secondary drive shaft also is coupled or at least can be coupled to the first drive assembly. For example, it is provided that the secondary drive shaft is coupled to the at least one wheel axle of the motor vehicle and, in particular, is coupled or can be coupled to it rigidly and/or permanently. The secondary drive shaft or the second transmission element of the epicyclic gear transmission is consequently coupled to or can be coupled to the first drive assembly with circumvention of the epicyclic gear transmission and/or with circumvention of the second drive assembly.

It is provided in this case that the secondary drive shaft is coupled to the epicyclic gear transmission, namely via the gearshift transmission, which is shifted in a speed-dependent manner. More precisely stated, the auxiliary drive shaft is coupled to the second transmission element of the epicyclic gear transmission via the gearshift transmission and therefore to a transmission element that differs from the first transmission element. The auxiliary drive or the at least one auxiliary assembly is coupled to or operatively connected to, in turn, the first transmission element of the epicyclic gear transmission, in particular rigidly and/or permanently. This means that the auxiliary drive or the auxiliary drive shaft has at all times the same speed as the transmission element to which it is coupled.

The auxiliary drive is equipped with the auxiliary drive shaft, to which the at least one auxiliary assembly is coupled, preferably rigidly and/or permanently. More preferably, a plurality of auxiliary assemblies are connected to the auxiliary drive shaft. Between the auxiliary drive shaft and the auxiliary assemblies, it is possible to provide the same gear transmission ratio in each case. Alternatively, it is also possible to provide different gear transmission ratios between the auxiliary drive shaft and the auxiliary assemblies for the different auxiliary assemblies.

Preferably, the auxiliary drive shaft is coupled to the second drive assembly via the epicyclic gear transmission, in particular permanently, or at least can be coupled thereto. For this purpose, the second drive assembly is coupled to or can be coupled to another transmission element of the epicyclic gear transmission. By means of the second drive assembly, for example, it is thus possible to regulate the speed of the auxiliary drive shaft. For example, the second drive assembly in this case is coupled to the secondary drive shaft via the epicyclic gear transmission and/or is coupled to the driven shaft, in particular rigidly and/or permanently, or at least can be coupled thereto. For this purpose, the secondary drive shaft or the driven shaft is linked to the second transmission element of the epicyclic gear transmission, so that, therefore, the second drive assembly, the auxiliary drive shaft, and the secondary drive shaft or the driven shaft are coupled with different transmission elements of the epicyclic gear transmission.

Additionally or alternatively, the auxiliary drive shaft can be operatively connected to the first drive assembly via the epicyclic gear transmission and the second drive assembly. Accordingly, the auxiliary drive shaft can be driven with the help of the first drive assembly, preferably with the help of both the first drive assembly and the second drive assembly. If, in addition, the epicyclic gear transmission is coupled to or at least can be coupled to the driven shaft of the drive device, which is preferably the case, it is possible, in addition, to use the kinetic energy of the motor vehicle for driving the auxiliary drive shaft and consequently the auxiliary assembly.

The gearshift transmission, by way of which the secondary drive shaft is coupled to the second transmission element, makes possible the adjustment of different gear transmission ratios between them. Therefore, the gearshift transmission has at least two gears, which have different gear transmission ratios. The gearshift transmission is shifted in a speed-dependent manner. This means that the gear engaged at the gearshift transmission or the adjusted gear transmission ratio depends on a speed, in particular on the speed of the secondary drive shaft or on the speed of the second transmission element, or on the speed of the auxiliary drive or the auxiliary drive shaft.

For example, it is therefore provided, depending on the travel speed of the motor vehicle, and accordingly depending on the speed of the driven shaft, and consequently on the speed of the secondary drive shaft, to select a gear transmission ratio from the plurality of gear transmission ratios of the gearshift transmission and to adjust it at the gearshift transmission. The speed-dependent shifting of the gearshift transmission can be produced by purely mechanical means and/or electronically. In the latter case, a speed sensor is provided, for example. A control instrument that is connected to the speed sensor selects, on the basis of the speed measured by means of the speed sensor, the appropriate gear transmission ratio from the plurality of gear transmission ratios and adjusts it at the gearshift transmission.

Such a construction of the drive device makes possible an extremely flexible use. Thus, for example, it is possible to provide that the auxiliary drive shaft is driven by means of the second drive assembly, and/or a torque is imposed on the driven shaft of the drive device, for example for driving or for braking the motor vehicle. In addition, it is possible with the help of the second drive assembly to control and/or to regulate the speed of the auxiliary drive shaft, in particular to a desired speed. Given an appropriate design, it is also possible to provide that the first drive assembly is started with the help of the second drive assembly, so that, therefore, the second drive assembly is present as a starter for the first drive assembly. If, in addition to the first drive assembly and the second drive assembly, another drive assembly is provided, then the latter can be unloaded or relieved at least temporarily with the help of the second drive assembly. It is also possible to increase the continuous output power of the drive device at least slightly.

Furthermore, given an appropriate configuration, there results the advantage that the driving of the auxiliary drive shaft brings about a braking of the motor vehicle by using the kinetic energy of the motor vehicle. This is advantageous when a recuperative braking of the motor vehicle is not possible with the help of the second drive assembly and/or the additional drive assembly, because, for example, the energy storage system can take up no further energy, in particular because it is completely full. Overall, the integration of the auxiliary drive in the drive device creates a highly integrated drive device, which can be operated in numerous operating states of the motor vehicle in an especially energy-efficient manner.

An especially advantageous configuration of the invention provides that the gearshift transmission is actuated by means of a centrifugal governor coupled to the secondary drive shaft. Therefore, the shifting of the gearshift transmission results depending on the speed the secondary drive shaft. The centrifugal governor is coupled to the secondary drive shaft, in particular, rigidly and/or permanently. For example, the centrifugal governor has at least one centrifugal force element on which a spring force is imposed, wherein the spring force effected by means of the spring element is opposed to the centrifugal force. When the secondary drive shaft rotates, the centrifugal force element is deflected opposite to the spring force.

The centrifugal governor or its centrifugal force element is coupled to the gearshift transmission, in particular to a shift sleeve of the gearshift transmission. For example, the centrifugal governor couples exactly one of a plurality of gear pairs in each case to secondary drive shaft or to the second transmission element, depending on the speed of the secondary drive shaft, this bringing about different gear transmission ratios between the secondary drive shaft and the second transmission element. The centrifugal governor represents the aforementioned purely mechanical means for shifting or actuating the gearshift transmission.

In the scope of another embodiment of the invention, it is provided that the centrifugal governor couples, in a speed-dependent manner, a gear set, which is coupled at the output side to the epicyclic gear transmission, or one of a plurality of gear sets, which are coupled at the output side to the epicyclic gear transmission, to the secondary drive shaft. Reference hereto was already made above. The gear set or the gear sets (each) have an input side and an output side. At the output side, the gear set or the gear sets is or are preferably coupled to the epicyclic gear transmission, namely to the second transmission element of the epicyclic gear transmission, preferably rigidly and/or permanently. At the output side, the centrifugal governor couples, in a speed-dependent manner, the gear set or one of the gear sets to the secondary drive shaft.

A further development of the invention provides that another gear set is coupled at the input side to the secondary drive shaft and is connected at the output side to the second transmission element via a gear freewheel. The additional gear set preferably is present when, in the present case, only the one gear set described above is provided. In this respect, the epicyclic gear transmission comprises the gear set and the additional gear set, preferably exclusively. The further gear set is preferably coupled to the secondary drive shaft, in particular rigidly and/or permanently.

At the output side, the additional gear set is connected to the second transmission element via the gear freewheel. The additional gear set is not actuated actively by means of the centrifugal governor in this respect. Such an actuation is provided solely for the above-mentioned gear set. The gear freewheel is arranged between the additional gear set and the second transmission element in such a way that it decouples the additional gear set from the second transmission element once the gear set is to be coupled or is coupled at the input side to the secondary drive shaft by means of the centrifugal governor.

A preferred embodiment of the invention provides that the second drive assembly is coupled to or can be coupled to a third transmission element of the epicyclic gear transmission. The third transmission element differs from the first transmission element and the second transmission element. In this respect, the second drive assembly is coupled to or can be coupled to the auxiliary drive and/or to the secondary drive shaft solely via the epicyclic gear transmission.

Another embodiment of the invention provides that the second drive assembly is connected to the first drive assembly via a first freewheel and/or can be coupled by means of a shift clutch to the first drive assembly. In this respect, the first freewheel and/or the shift clutch are present in the connection between the second drive assembly and the first drive assembly. With the presence of a first direction of rotation of the second drive assembly in relation to the first drive assembly, the first freewheel establishes an operative connection between the two drive assemblies and, with the presence of a second direction of rotation, which is opposite to the first direction of rotation, the first freewheel severs this operative connection.

Accordingly, it is possible in this way, for example, to drive the first drive assembly by operation of the second drive assembly in the first direction of rotation, whereas, when the second direction of rotation is present, the second drive assembly is decoupled from the first drive assembly and thus can be employed exclusively for driving the auxiliary drive.

In addition to the first freewheel or alternatively to the first freewheel, the shift clutch can be present. It serves for a controlled coupling of the second drive assembly to the first drive assembly or for decoupling of the two drive assemblies from each other. In other words, in a first shift position of the shift clutch, the second drive assembly is coupled to the first drive assembly, in particular rigidly, whereas, in a second shift position of the shift clutch, the two drive assemblies are decoupled completely from each other.

A further development of the invention provides that the second drive assembly is connected to the third transmission element via a second freewheel. The second freewheel is designed in such a way that, when a first direction of rotation of the second drive assembly in relation to the third transmission element is present, the operative connection between them is severed and, when a second direction of rotation, which is opposite to the first direction of rotation, is present, the operative connection is established. In this respect, it is possible with the help of the second freewheel to drive the third transmission element, for example, by means of the second drive assembly when the latter is operated in the second direction of rotation.

If, in contrast, the first direction of rotation is present, then the second drive assembly is decoupled from the third transmission element. The direction of coupling of the second freewheel is opposite to the direction of coupling of the first freewheel, for example. Preferably, in this respect, for the presence of the first direction of rotation, the second drive assembly serves for driving the first drive assembly, with it being decoupled from the third transmission element. Conversely, when the second direction of rotation is present, the second drive assembly drives the third transmission element, with it being decoupled from the first drive assembly.

Another preferred embodiment of the invention provides that two of the transmission elements of the epicyclic gear transmission are connected directly to each other via a third freewheel and/or can be fixed with respect to each other by means of a lock-up clutch. The third freewheel is present between the two transmission elements of the epicyclic gear transmission. In the case of a first direction of rotation of the two transmission elements against each other, they are coupled to each other by the third freewheel, in particular rigidly. In contrast, in the case of a second direction of rotation that is opposite to the first direction of rotation, the third freewheel releases the two transmission elements, so that they are not coupled to each other via the third freewheel.

Additionally or alternatively to the third freewheel, it is possible to provide the lock-up clutch, which, in a first shift position, fixes the two transmission elements against each other and, in a second shift position, releases them with respect to each other. With the help of the third freewheel or the lock-up clutch, it is possible to achieve a locking of the epicyclic gear transmission.

Finally, in the scope of another embodiment of the invention, it is provided that the first transmission element exists as a planetary gear carrier, the second transmission element as a sun gear, and the third transmission element as a ring gear, wherein at least one planetary gear, mounted rotatably at the planetary gear carrier, meshes with both the sun gear and the ring gear. In this respect, the epicyclic gear transmission has a conventional construction. It can be referred to alternatively as a planetary gear transmission.

The invention further relates to a method for operating a drive device for a motor vehicle, in particular a drive device in accordance with the above statements, wherein the drive device is equipped with a first drive assembly, a second drive assembly, and an auxiliary drive that has at least one auxiliary assembly, this drive being coupled to or can be coupled to, respectively, the first drive assembly and the second drive assembly via an epicyclic gear transmission, wherein the auxiliary drive is coupled to a first transmission element of the epicyclic gear transmission. In this case, it is provided that a second transmission element of the epicyclic gear transmission is coupled via a gearshift transmission, which is shifted in a speed-dependent manner, to a secondary drive shaft that is coupled to or can be coupled to the first drive assembly.

Reference has already been made to the advantages of an approach of this kind or of a configuration of the drive device of this kind. Both the drive device and the method for the operation thereof can be developed further in accordance with the above statements, so that in this regard, reference is made to said statements.

BRIEF DESCRIPTION OF THE DRAWINGS

The invention will be explained in detail below on the basis of exemplary embodiments illustrated in the drawing, without any resulting limitation of the invention. Shown are.

DETAILED DESCRIPTION OF THE DRAWINGS

Figure 1:
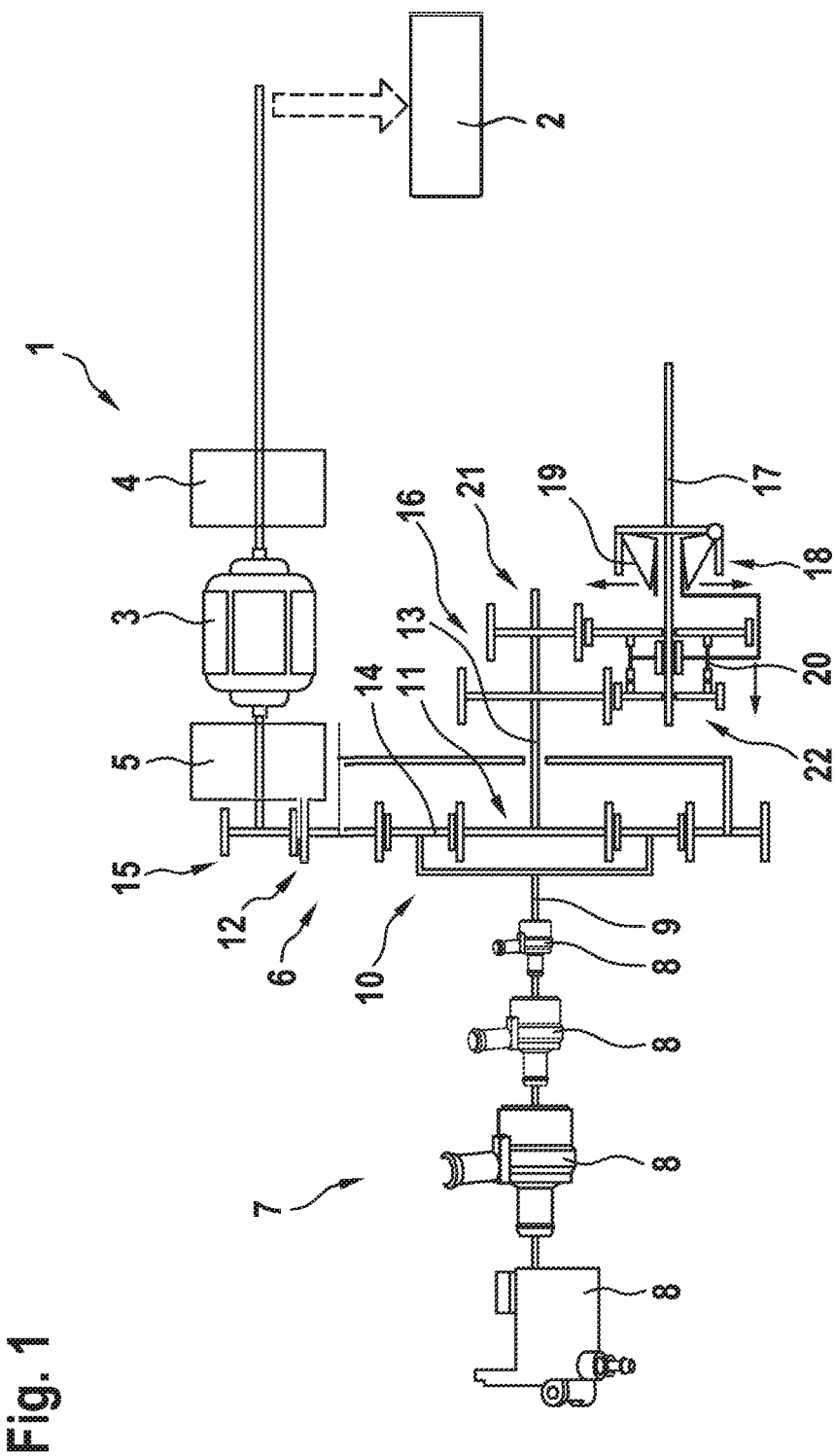
FIG. 1 a schematic illustration of a drive device for a motor vehicle in a first embodiment.

FIG. 1 shows a schematic illustration of a drive device 1 for a motor vehicle, which is not illustrated in greater detail here. The drive device 1 serves for driving at least one wheel axle of the motor vehicle, which can have two axle members, which are operatively connected via a transmission, in particular an axle differential transmission, to a driven shaft of the drive device. Each of the axle members is preferably associated with at least one wheel (not illustrated here) of the motor vehicle or is connected thereto rigidly and/or permanently.

The drive device 1 is equipped with a first drive assembly 2 and a second drive assembly 3. The two drive assemblies 2 and 3 can be optionally coupled or decoupled by means of a clutch 4. The clutch 4 can be present in the form of first freewheel or alternatively in the form of a shift clutch. However, the clutch 4 is optional. Alternatively, it is possible to provide a rigid coupling between the two drive assemblies 2 and 3.

The second drive assembly 3 is coupled to an epicyclic gear transmission 6 via a further clutch 5, which can be present in the form of a second freewheel. Via the epicyclic gear transmission 6, in this regard, the first drive assembly 2 and the second drive assembly 3 can be coupled to an auxiliary drive 7, which is equipped with at least one auxiliary assembly 8 or, in the embodiment illustrated here, a plurality of auxiliary assemblies 8. The at least one auxiliary assembly 8 is coupled to an auxiliary drive shaft 9, which, in turn, is coupled to the epicyclic gear transmission 6, in particular rigidly and/or permanently.

The epicyclic gear transmission 6 is equipped with a first transmission element 10, a second transmission element 11, and a third transmission element 12. The first transmission element 10 is coupled to the auxiliary drive 7 or to the auxiliary drive shaft 9, in particular, rigidly and/or permanently. The third transmission element 12 is coupled to or can be coupled to (respectively) the first drive assembly 2 and/or the second drive assembly 3, in particular with the help of the clutches 4 and 5. The second transmission element 11 is coupled to an intermediate shaft 13, in particular rigidly and/or permanently.

It can be recognized that the first transmission element 10 is configured as a planetary gear carrier, on which at least one planetary gear 14 is rotatably mounted. The planetary gear 14 meshes, on the one hand, with the second transmission element 11, which is configured as a sun gear, and, on the other hand, with the third transmission element 12, which is designed as a ring gear. The two drive assemblies 2 and 3 can be coupled to or are coupled to the third transmission element 12 via an intermediate gear stage 15.

The intermediate shaft 13 is present as an output shaft of a gearshift transmission 16, which is shifted in a speed-dependent manner. Serving as input shaft of the gearshift transmission 16 is a drive shaft 17 of an auxiliary drive, this shaft 17 being coupled, or can be coupled, to the driven shaft 31 of the drive device 1, in particular, rigidly and/or permanently. In this regard, the auxiliary-drive drive shaft 17 is coupled to or can be coupled to the first drive assembly 2 with circumvention of the epicyclic gear transmission 6. The operative connection between the first drive assembly 2 and the auxiliary-drive drive shaft 17 is present here by way of a gearshift transmission 30 of the drive device that is provided between the first drive assembly 2 and the driven shaft 31 of the drive device 1.

The speed-dependent shifting of the gearshift transmission 16 is accomplished by means of a centrifugal governor 18, which is coupled to the secondary drive shaft 17, in particular rigidly and/or permanently. The centrifugal governor 18 has, for example, at least one centrifugal force element 19, on which a spring force, which is opposite to the centrifugal force, is imposed. For example, the centrifugal governor 18 is coupled to the gearshift transmission 16 in such a way that a displacement of the centrifugal force element 19 brings about a displacement of a shift sleeve 20 of the gearshift transmission 16.

Depending on the position of the shift sleeve 20, one of a plurality of gear sets 21 and 22 is coupled to the secondary drive shaft 17. In this case, the gear sets 21 and 22 are each present between the secondary drive shaft 17 and the intermediate shaft 13. In particular, the gear sets 21 and 22 are each coupled rigidly and/or permanently at the output side to the intermediate shaft 13. The gear sets 21 and 22 have gear transmission ratios that differ from each other.

Figure 2:
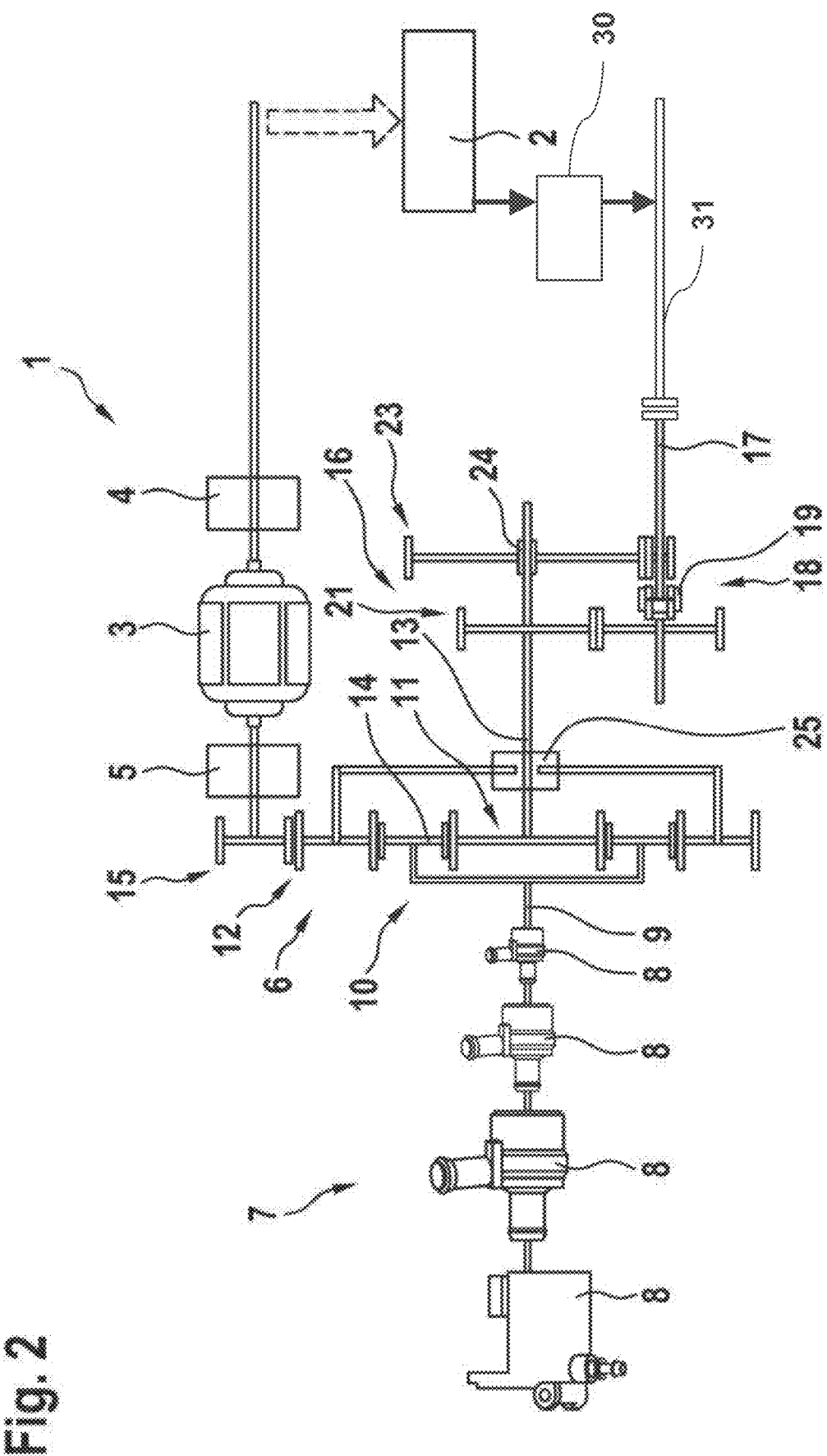
FIG. 2 the drive device for the motor vehicle in a second embodiment.

FIG. 2 shows a schematic illustration of the drive device 1 in a second embodiment. This embodiment is configured fundamentally similarly to the embodiment described above, so that reference is made to the corresponding statements and only differences are addressed below. These differences lie in the fact that only one of the gear sets 21 and 22—in this case, for example, the gear set 21—is provided and, in place of the respective other gear set, another gear set 23 is provided. This additional gear set 23 is coupled at the input side to the secondary drive shaft 17, namely preferably rigidly and/or permanently. At the output side, the additional gear set 23 is connected to the second transmission element 11 or to the intermediate shaft 13 via a gear freewheel 24.

The centrifugal governor 18 is then configured in such a way that it couples the gear set 21 to the secondary drive shaft 17 depending on the speed of the latter or severs the operative connection thereto. By means of a configuration of this kind, a design simplification is achieved with nearly identical functionality to that of the first embodiment. Additionally or alternatively to this difference, another difference can exist in the fact that a clutch 25 is present, by way of which two of the transmission elements 10, 11, and 12 of the epicyclic gear transmission 6—in the exemplary embodiment illustrated here, the transmission elements 11 and 12—can be coupled to each other. The clutch 25 can be present in the form of a third freewheel or a lock-up clutch.

The above-described embodiments of the drive device 1 have the advantage that an operation of the auxiliary drive 7 can take place nearly independently of a driving state of the motor vehicle and/or an operating state of the first drive assembly 2. In particular, in the case that the motor vehicle is in motion, the kinetic energy of the motor vehicle can be utilized for driving the auxiliary drive 7, with it being possible, in particular in this case, to adjust a speed of the auxiliary drive 7 or the auxiliary drive shaft 9 by means of the second drive assembly 3 by way of the epicyclic gear transmission 6, namely preferably to a desired speed.

The invention claimed is:

1. A drive device for a motor vehicle, comprising:
a first drive assembly, a second drive assembly, and an auxiliary drive having at least one auxiliary assembly, the auxiliary drive being coupled to or can be coupled to the first drive assembly and the second drive assembly via an epicyclic gear transmission, wherein the auxiliary drive is coupled to a first transmission element of the epicyclic gear transmission, wherein a secondary drive shaft is coupled to a second transmission element of the epicyclic gear transmission via a gearshift transmission, the gearshift transmission configured to be shifted in a speed-dependent manner, wherein the first drive assembly is configured to provide torque generated by the first drive assembly to the second transmission element of the epicyclic gear transmission via the secondary drive shaft and the gearshift transmission, wherein the first drive assembly is also configured to receive torque generated by the second drive assembly via a torque pathway which circumvents the epicyclic gear transmission, wherein, through the torque pathway which circumvents the epicyclic gear transmission, the second drive assembly is connected to the first drive assembly by a first freewheel or can be coupled to the first drive assembly by a shift clutch.

2. The drive device according to claim 1, wherein another gear set is coupled at the input side to the secondary drive shaft and at the output side to the second transmission element via a gear freewheel.

3. The drive device according to claim 1, wherein the first transmission element is present as a planetary gear carrier, the second transmission element is present as a sun gear, and the third transmission element is present as a ring gear, wherein at least one planetary gear that is mounted rotatably at the planetary gear carrier meshes with both the sun gear and the ring gear.

4. The drive device according to claim 1, wherein the gearshift transmission is actuated by a centrifugal governor that is coupled to the secondary drive shaft.

5. The drive device according to claim 4, wherein the centrifugal governor couples, in a speed-dependent manner, a gear set, which is coupled to the epicyclic gear transmission at the output side, or couples one of a plurality of gear sets, which are coupled to the epicyclic gear transmission at the output side, to the secondary drive shaft.

6. The drive device according to claim 1, wherein the second drive assembly is connected to the third transmission element via a second freewheel.

7. The drive device according to claim 6, wherein two of the transmission elements of the epicyclic gear transmission are connected directly to each other via a third freewheel or can be fixed against each other by means of a lock-up clutch.

8. A method for operating a drive device for a motor vehicle, comprising:

equipping the drive device with a first drive assembly, a second drive assembly, and an auxiliary drive having at least one auxiliary assembly; and coupling the auxiliary drive to the first drive assembly and the second drive assembly via an epicyclic gear transmission, wherein the auxiliary drive is coupled to a first transmission element of the epicyclic gear transmission, wherein a secondary drive shaft is coupled to a second transmission element of the epicyclic gear transmission via a gearshift transmission, the gearshift transmission configured to be shifted in a speed-dependent manner, wherein the first drive assembly is configured to provide torque generated by the first drive assembly to the second transmission element of the epicyclic gear transmission via the secondary drive shaft and the gearshift transmission, wherein the first drive assembly is also configured to receive torque generated by the second drive assembly via a torque pathway which circumvents the epicyclic gear transmission wherein, through the torque pathway which circumvents the epicyclic gear transmission, the second drive assembly is connected to the first drive assembly by a first freewheel or can be coupled to the first drive assembly by a shift clutch.

\* \* \* \* \*